UNITED STATES PATENT OFFICE.

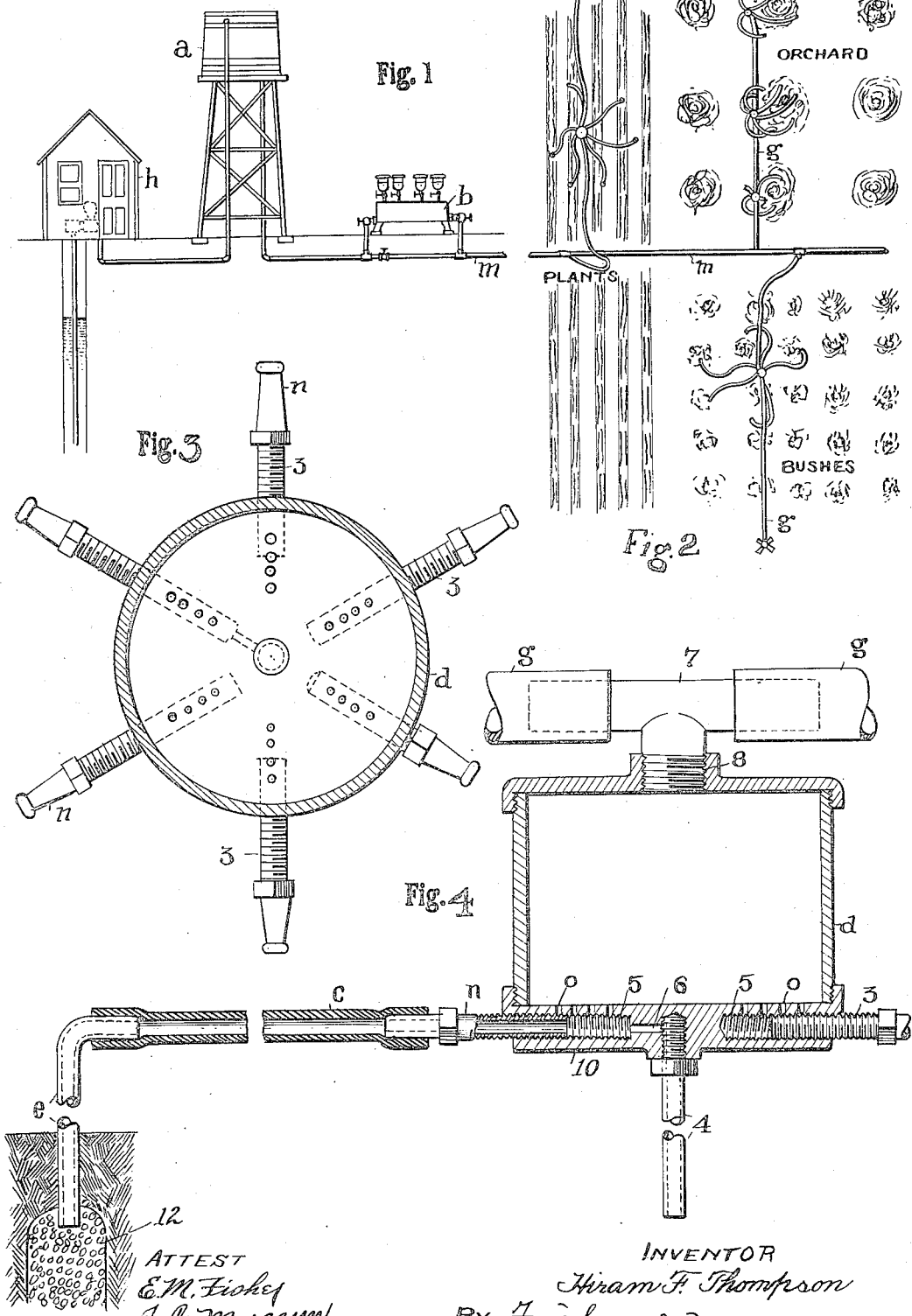

HIRAM F. THOMPSON, OF LEXINGTON, OHIO.

TREE AND PLANT IRRIGATION.

1,042,501.  Specification of Letters Patent.  Patented Oct. 29, 1912.

Application filed September 1, 1911. Serial No. 647,266.

*To all whom it may concern:*

Be it known that I, HIRAM F. THOMPSON, citizen of the United States, residing at Lexington, in the county of Richmond and State of Ohio, have invented certain new and useful Improvements in Tree and Plant Irrigation, of which the following is a specification.

This invention relates to an improvement in tree and plant irrigation wherein a supply of water is maintained through a fertilizing medium, if desired, and the water is distributed by suitable branch pipes to individual trees or to rows of plants, berries and the like, all substantially as shown and described and particularly pointed out in the claims.

Figure 1 is a side elevation showing a water tank and supply connections, and Fig. 2 is a diagrammatic view of an orchard or garden showing lines of irrigating and distributing pipes provided at intervals with devices according to the conceptions of my invention. Fig. 3 is an enlarged horizontal section of one of the water distributers constituting the present invention, and Fig. 4 is a sectional side elevation thereof.

The irrigating system in connection with which my improved device is shown may be more or less extensive in its proportions and capacity according to the needs in a given case, ranging from the demands of a domestic garden to areas comprising many acres, and the same distributing means are employed for all purposes whether trees, plants, shrubs, berries or other growths adapted to receive localized applications. To these ends I can employ any available source of supply, as an elevated water tank $a$ which has connection with a power and pump house $h$, or other head having a gravity feed, or the main $m$ may be connected directly with a power driven force pump, not shown. In fact any available head that will sustain distribution of the water can be used. In the line of the said main I arrange to run the water through or in connection with a fertilizing apparatus $b$, so that when it is deemed desirable the irrigating stream may be supplied with a fertilizing element or ingredient or ingredients in any preferred proportions. As to the kind of fertilizer used the condition of the soil and the nature and need of the plant or other growth will have to determine, and the water supply may flow through the fertilizer or the fertilizer may be fed to the water under a suitable control for proportions as may be deemed best, and according to the fertilizer used.

On the ground or field I employ my improved distributer shown in Figs. 3 and 4 which comprises a receptacle $d$ having a suitable capacity say two to four inches across and connected up with the main supply pipe $m$ by means of flexible hose $g$ in this instance. As shown, also, the said receptacles or chambers $d$ can be connected up in series with as many as may be wanted on a single line and so as to place one at each tree in a row or in case of plants or the like have one every six or eight or more feet as may be needed, the nature of the soil and other conditions determining the positions. Each of the said receptacles has one or more distributing pipes 3 inserted in its bottom and open through said bottom to the water within, and I also provide a central distributing pipe 4 in the bottom of the receptacle which may serve also as a leg to support the receptacle in the ground. In fact in some cases I may use only the said pipe 4 and close all the others, and again I may use one or more of the others with it or cut it out entirely and use only the side pipes 3. As to the said pipes 3 they are in fact of a compound character comprising nipples $n$, flexible connections $c$ and right angled or elbow shaped terminals $e$ adapted in their longer down portions to penetrate the soil more or less and stand erect therein. The said nipples $n$ project radially into the bottom of the receptacle which has threaded holes 5 to receive them which holes extend to near the middle of the said bottom while the threaded shanks of the nipples enter said holes only about half way more or less ordinarily, leaving the inner portions thereof unoccupied. These inner portions have small ducts or perforations $o$, one or more, to supply water to said holes and thence through said nipples to the earth. But the said nipples can be run in so as to cover all said perforations and thus totally cut off the water supply through the same, or they can be made to cover one or more of said perforations as may be demanded, and thus the said nipples in fact are made controlling means or valves governing the supply of water to the soil and no other means need be used for this purpose.

In the case of stem or pipe 4 I show a connecting channel 6 between the threaded hole therefor and the sectioned hole 5 at its left in Fig. 4, and water is supplied thereto by partially withdrawing said stem 4 until its open end will communicate with channel 6, and the valve nipple n controls the flow of water thereto as it also does to itself, as above described.

Joints or couplings 7 are employed in the lateral hose g at each receptacle to make threaded connection with an internally threaded neck 8 in the top or cover therefor, and said cover is tight on the receptacle but also removable, and the bottom 10 also is a removable member. This is especially advantageous practically on the field and for handling, connecting and otherwise dealing with the several parts as well as for economical manufacture.

In the case of trees I may provide a small well 12 in the earth into which the elbow e is adapted to discharge, and fill the said well with fine gravel or the like which will hold the water back more or less and afford a gradual distribution, and in the case of rows of plants, berry bushes or the like, I may make trenches beneath the rows and fill the same with straw, pine needles or like conductors and retainers of moisture. Such material in a trench will give the water out gradually as it is needed and becomes a sort of zone of moisture which nourishes all the plants within its reach by its after dampness even when the water that will travel has been conducted away. The so-called well 12 in Fig. 4 may also be considered at a cross section of a trench or channel of this kind filled as described.

The pipe or stem 4 which enters the ground and supports the receptacle, may itself be used to determine the flow of water through the same if the channel thereto be otherwise open, but when closed it is a mere support or leg for the receptacle to stand upon.

The capillary movement of the water in the trench or well 12 when straw or the like is used is of course well known, but such trench need not necessarily be used, and between rows of plants with a short season's growth it would not probably be found practicable. It is, however, very desirable between rows of berries or other perennial growths.

What I claim is:

1. In tree and plant irrigation, a water distributing receptacle having in its bottom a horizontal threaded outlet, a series of perforations entering said outlet and a central hole communicating with said outlet, and discharge pipes adjustably engaged in said outlet and said hole respectively.

2. In tree and plant irrigation, a distributing receptacle having radially disposed threaded outlets in its bottom and distributing pipes screwed into the respective outlets and having nipple shaped extremities, said bottom having a row of perforations for each outlet controlled by the respective pipes, said bottom also having a central vertical hole, a threaded pipe in said hole, and a duct from one of said threaded outlets to said hole to supply water thereto.

3. A fluid receptacle for irrigation provided with supply connections at its top, and a central vertical hole and a plurality of horizontally disposed bores in its bottom, said bottom having a plurality of perforations entering the said bores from within the receptacle to admit water thereto, in combination with pipes adjustable in said bores, respectively, flexible hose on the outer ends of said pipes, substantially elbow shaped discharge pipes for the water on the outer ends of said hose each adapted to have one end inserted in the soil, and a discharge pipe in said central hole in fluid connection with one of said horizontally disposed bores.

4. In tree and plant irrigation, a distributing receptacle having radially disposed outlets in its bottom provided with openings into the receptacle to receive a supply of water, and distributing pipes projecting into said outlets and constructed to control the flow of water into the same from the receptacle, said receptacle having a centrally and vertically disposed duct in the bottom thereof in supply relations with one of said radially disposed outlets.

In testimony whereof I affix my signature in presence of two witnesses.

HIRAM F. THOMPSON.

Witnesses:
F. C. MUSSUN,
H. T. FISHER.